C. T. CULLISON.
VEHICLE AXLE.
APPLICATION FILED JAN. 18, 1909.

933,293.

Patented Sept. 7, 1909.

Witnesses
W. G. Jones.
F. L. Ourand.

Inventor
Charles T. Cullison
By Louis Bagger & Co.
Attorneys

UNITED STATES PATENT OFFICE.

CHARLES T. CULLISON, OF WORTHINGTON, INDIANA.

VEHICLE-AXLE.

933,293.     Specification of Letters Patent.     Patented Sept. 7, 1909.

Application filed January 18, 1909. Serial No. 472,869.

*To all whom it may concern:*

Be it known that I, CHARLES T. CULLISON, a citizen of the United States, residing at Worthington, in the county of Greene and State of Indiana, have invented certain new and useful Improvements in Vehicle-Axles, of which the following is a specification.

My invention relates to improvements in vehicle axles, and the object is to provide means for preventing dust from coming in contact with the axle.

A further object is to provide a cap for closing the end of the hub to prevent dust from collecting around the nut, which is screwed upon the axle for retaining the wheel upon the axle.

The invention consists of certain novel features of construction and combinations of parts which will be hereinafter described and pointed out in the claims.

Figure 1:
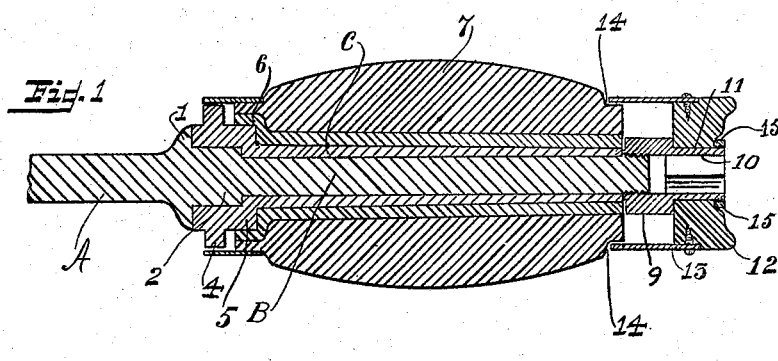
Figure 2:
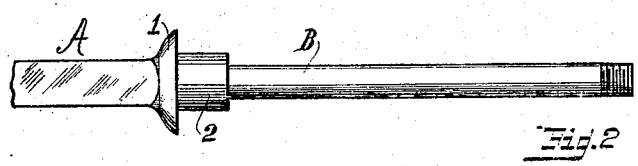
Figure 3:
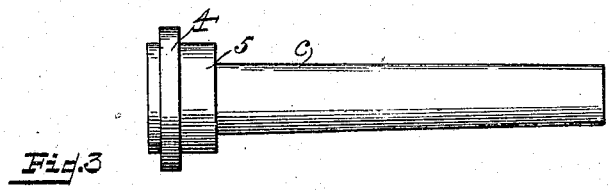
Figure 4:
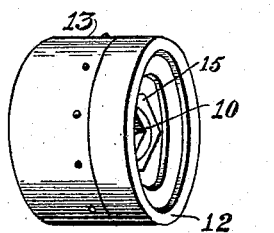

In the accompanying drawings: Figure 1 is a longitudinal view through the axle and hub disclosing my invention; Fig. 2 is a view of the spindle; Fig. 3 is a view of the sleeve; and Fig. 4 is a perspective view of the cap and nut.

A represents the axle and B is the axle spindle. A flange 1 is formed at the inner end of the spindle which extends above the main portion of the axle A. A cylindrical shoulder 2 is formed at the inner end of the spindle. A sleeve C is constructed similarly to the spindle except that it is hollow and is adapted to be received over the spindle and upon the shoulder 2. The sleeve is constructed with an inner flange 4 and a cylindrical shoulder 5, which is adapted to receive the metal hub-box 6 received in the hub 7 of the wheel. The hub-box is made to conform to the shape of the sleeve as is usual in the construction of the hub of a wheel.

The outer end of the spindle B is screw-threaded and extends beyond the sleeve C. The nut 9 is adapted to be screwed upon the end of the spindle for holding the hub upon the axle. The nut is provided with an elongated shank 10, which is hollow, and preferably made square to receive a wrench for screwing or unscrewing the nut on the axle.

A circumferential groove 11 is formed on the shank and received in the groove is a collar 12 and is held thereon by a nut 15. Mounted on the collar is a cylindrical band 13, which is fastened thereto by nails or other means. The band is adapted to be received in an annular groove or recess 14 formed on the end of the hub. The collar and band form a cap to prevent dust or other foreign matter from coming in contact with the axle or spindle. The collar is loosely mounted upon the shank of the nut so that it will in no wise interfere with the movement of the nut, but it is capable of rotating with the nut.

The sleeve will receive the entire wear or practically the entire wear, and the spindle of the axle will receive little or no wear from the rotation of the wheel upon the sleeve. The sleeve, after becoming worn, can be removed and a new sleeve substituted. The sleeve can be mounted on the spindle and will be retained in position by coming in contact with the flange and shoulder of the spindle and by the nut which is screwed on the outer end of the spindle, the nut at the same time retaining the hub on the wheel upon the sleeve, due to its engagement with one end of the hub-box; the other or inner end of the hub-box coming in contact with the flange on the sleeve. By providing means whereby a new sleeve can be substituted saves the expense of removing a spindle and welding a new spindle upon the axle. The sleeve can be manufactured at a less cost than building an entirely new spindle.

It is evident that more or less slight changes might be resorted to in the form and arrangement of the several parts described without departing from the spirit and scope of my invention, and hence I do not wish to be limited to the exact construction herein set forth, but:

Having fully described my invention, what I claim as new and desire to secure by Letters Patent, is:—

1. The combination with an axle having a spindle, of a hub mounted on the axle, a nut received on the spindle for retaining the hub in position, a cap loosely mounted on the nut for preventing foreign matter from coming in contact with the axle, and means connected to the nut for retaining the cap in position.

2. The combination with an axle having a spindle, of a sleeve mounted on the spindle, a hub mounted on the sleeve, a nut received upon the spindle for retaining the hub in position, and a cap loosely journaled on the nut preventing dust from coming in contact with the nut and axle.

In testimony whereof I affix my signature, in the presence of two witnesses.

CHARLES T. CULLISON.

Witnesses:
TAYLOR MESSICK,
THOMAS H. GREENSLAD.